US005267365A

United States Patent [19]

Walter

[11] Patent Number: 5,267,365

[45] Date of Patent: Dec. 7, 1993

[54] BED MATTRESS OR THE LIKE AND PRESSURIZED LIQUID SUPPLY SYSTEM

[76] Inventor: Bruno H. Walter, 9007-103 Street, Edmonton, Alberta, Canada, T5R 0P3

[21] Appl. No.: 838,756

[22] PCT Filed: Sep. 18, 1990

[86] PCT No.: PCT/CA90/00300

§ 371 Date: Apr. 27, 1992

§ 102(e) Date: Apr. 27, 1992

[87] PCT Pub. No.: WO91/03971

PCT Pub. Date: Apr. 4, 1991

[30] Foreign Application Priority Data

Sep. 19, 1989 [CA] Canada .................................. 611874

[51] Int. Cl.[5] .............................................. A61C 7/04

[52] U.S. Cl. .......................................... 5/455; 5/456; 5/953; 128/33

[58] Field of Search .......................... 5/453, 455, 456; 128/33, 38, 39, 40, 400

[56] References Cited

U.S. PATENT DOCUMENTS 2,437,006 3/1948 Simpson .............................. 128/33
2,719,986 10/1955 Rand .................................. 5/348
3,128,125 4/1964 Loewy .............................. 297/452
3,297,023 1/1967 Foley .................................. 128/33
3,477,071 11/1969 Emerson .................................. 5/61
3,595,223 7/1971 Castagna .............................. 128/33
3,701,173 10/1972 Whitney ................................ 5/349
3,982,786 9/1976 Burgin et al. ...................... 297/284
4,068,334 1/1978 Randall .................................. 5/365
4,135,500 1/1979 Gorran .............................. 5/453 X
4,175,297 11/1979 Robbins et al. .................. 128/33 X
4,193,149 3/1980 Welch .................................... 5/447
4,197,837 4/1980 Tringali et al. ...................... 128/33
4,255,824 3/1981 Pertchik ................................ 5/441
4,347,633 9/1982 Gammons et al. .................... 5/453
4,391,009 7/1983 Schild et al. .......................... 5/453
4,472,847 9/1984 Gammons et al. .................... 5/453
4,622,706 11/1986 Takeuchi .............................. 5/453
4,653,130 3/1987 Senoue et al. ........................ 5/453
4,722,105 2/1988 Douglas ................................ 5/453
4,777,679 10/1988 DeLooper ............................ 5/453
4,799,276 1/1989 Kadish .................................. 5/446
4,827,546 5/1989 Cvetkovic .............................. 5/455
4,852,195 8/1989 Schulman .............................. 5/453
4,864,671 9/1989 Evans .................................... 5/453
4,993,920 2/1991 Harkleroad et al. ............... 5/453 X
5,029,939 7/1991 Smith et al. ...................... 128/33 X
5,052,377 10/1991 Frajdenrajch .................. 128/39 X

FOREIGN PATENT DOCUMENTS 547744 10/1957 Canada .
879575 8/1971 Canada .
1070863 1/1980 Canada .
1077173 5/1980 Canada .
1147873 6/1983 Canada .
1224888 7/1987 Canada .
158249 4/1990 Denmark .

*Primary Examiner*—Michael F. Trettel
*Attorney, Agent, or Firm*—Hovey, Williams, Timmons & Collins

[57] ABSTRACT

A system is described for delivery of pressurized liquid to one or more hollow mattress for alternately pressurizing and depressurizing a selected group of cells of the mattress. The device is associated with a unique mattress in which the cells are disposed in a checkerboard fashion. The system utilizes one or more pressure accumulators arranged to maintain the system under a constant, predetermined pressure and to absorb sudden local pressure increases which may occur e.g. when a patient supports himself on his/her elbow or the like, creating a high specific pressure over a small area. The accumulators may also serve the purpose of maintaining the depressurized cells at a pressure which is equal to or above the ambient atmospheric pressure whereby the volume of liquid to be displaced by the primer such as a pump on pressurization is minimal. By utilizing liquid, preferably water, rather than the usual inflating with pressurized air, the system saves space, is quieter in operation and can be provided with further auxiliaries such as vibrators, heaters or the like. The mat according to the invention avoids the usual linear contact regions between the body and the mattress with a series of generally point-like contact spots. It is simple to produce and can be produced as a throw-away item which is particularly useful when used in hospitals or the like.

12 Claims, 7 Drawing Sheets

BED MATTRESS OR THE LIKE AND PRESSURIZED LIQUID SUPPLY SYSTEM

The present invention relates to the art of hollow pressurizable mats or mattresses. In particular, the invention relates to the structure of such mattress and to a pressurized liquid supply system for alternately pressurizing and depressurizing the mat.

The art of pressurized mats has long been subject to intensive development. The basic idea of pressurizable mats is in that a pressurized medium is alternately supplied to a selected group of cells of the mat such that the body is supported at alternating points thus preventing or at least reducing the development of bed sores.

Despite intensive research and development and skillful marketing, the systems thus far developed do not appear to have found wide acceptance in the market even though the beneficial effect of the alternate support of the body is well known.

One of the reasons for this problem is the relative complexity of the known supporting systems. Virtually all of the systems proposed for use in this field operate as pneumatic arrangements. They require relatively high volumes of the pressurized medium to be displaced during the operation. They are usually relatively noisy to operate and thus are not suitable for medical institutions where the quiet environment is often an important aspect of the recovery.

Air inflatable mattresses and systems for operating same are disclosed in numerous prior art patents among which the following are of interest: Canadian Patents 547,744 (Rand); 879,575 (Stuart); 1,070,863 (Tringali et al.); Canadian Patent 1,077,173 (Hopkins); 1,147,873 (Jackson) and 1,224,888 (Takeuchi).

As mentioned above, they suffer from the drawback of relative complexity of the overall system, difficulties associated with the maintenance of quiet operation and, as far as the mattress itself is concerned with a generally linear local of support of the body at any instant point in time of operation of the device. The only possible arrangement which may slightly differ is the compartmented air mattress shown in Canadian Patent 879,575 in which the mattress is comprised of a number of compartments each of which may be inflated to a predetermined pressure. This arrangement, however, is not suitable for a continuously alternating pressure increase and decreases. The trend of inflatable, pressurized air-filled mats is further exemplified by numerous U.S. patents such as U.S. Pat. Nos. 4,193,149 (Welch); 4,622,706 (Takeuchi); 4,197,837 (Tringali et al.); 4,347,633 (Gammons et al.); 4,472,847 (Gammons et al.); 3,701,173 (Whitney); 4,068,334 (Randall); 4,391,009 (Schild et al.); 4,799,276 (Kadish); 4,722,105 (Douglas) and 4,777,679 (DeLooper).

The above prior art references show pneumatic systems in which a continuous, linear arrangement of the alternately inflated and deflated cells. The linear support of the body has a relatively low effect in avoiding the formation of bed sores.

Attempts are known to introduce a system forming a matrix of freely vertically displaceable supports more or less in a point-like fashion. One of such systems is disclosed in U.S. Pat. No. 4,799,276 to Kadish. This solution, however, presents an expensive, complex arrangement of pressurized air-supported pistons. Another system known from the above U.S. Pat. No. 4,722,105 to Douglas utilizes a plurality of contiguous inflatable cells and a blower cooperating with solenoid valves to automatically seal-off inflation air present in the cells. Again, this is a complex structural arrangement. Also, it suffers from the same drawbacks as all of the remaining pneumatic arrangements, namely the noisy operation.

It is an object of the present invention to advance the art of hollow pressurizable mattresses of the above type by providing, in a first aspect, a system which alternately pressurizes and depressurizes selected cells of the mattress, which is quiet in operation, relatively simple in structure and requires a minimum displacement of the fluid used in operating the mattress.

It is another object of the present invention to provide a hollow, pressurizable mattress which would combine the advantage of alternating, generally point-like support locations spaced from each other, with structural simplicity of the mat and a relatively low production cost of the mattress itself.

The tern."mat" or "mattress" used throughout this specification and claims is to be interpreted broadly as meaning not only bed mattresses used in hospitals or otherwise, but also supporting mats useful in the art of seats, e.g. for truck or bus drivers for any other purpose in which the comfort of body support is desired.

The general features of the present invention are defined in the appended claims.

The invention will be described with reference to the accompanying diagrammatic, simplified drawings, by way of several exemplary embodiments.

DETAILED DESCRIPTION

Figure 1:
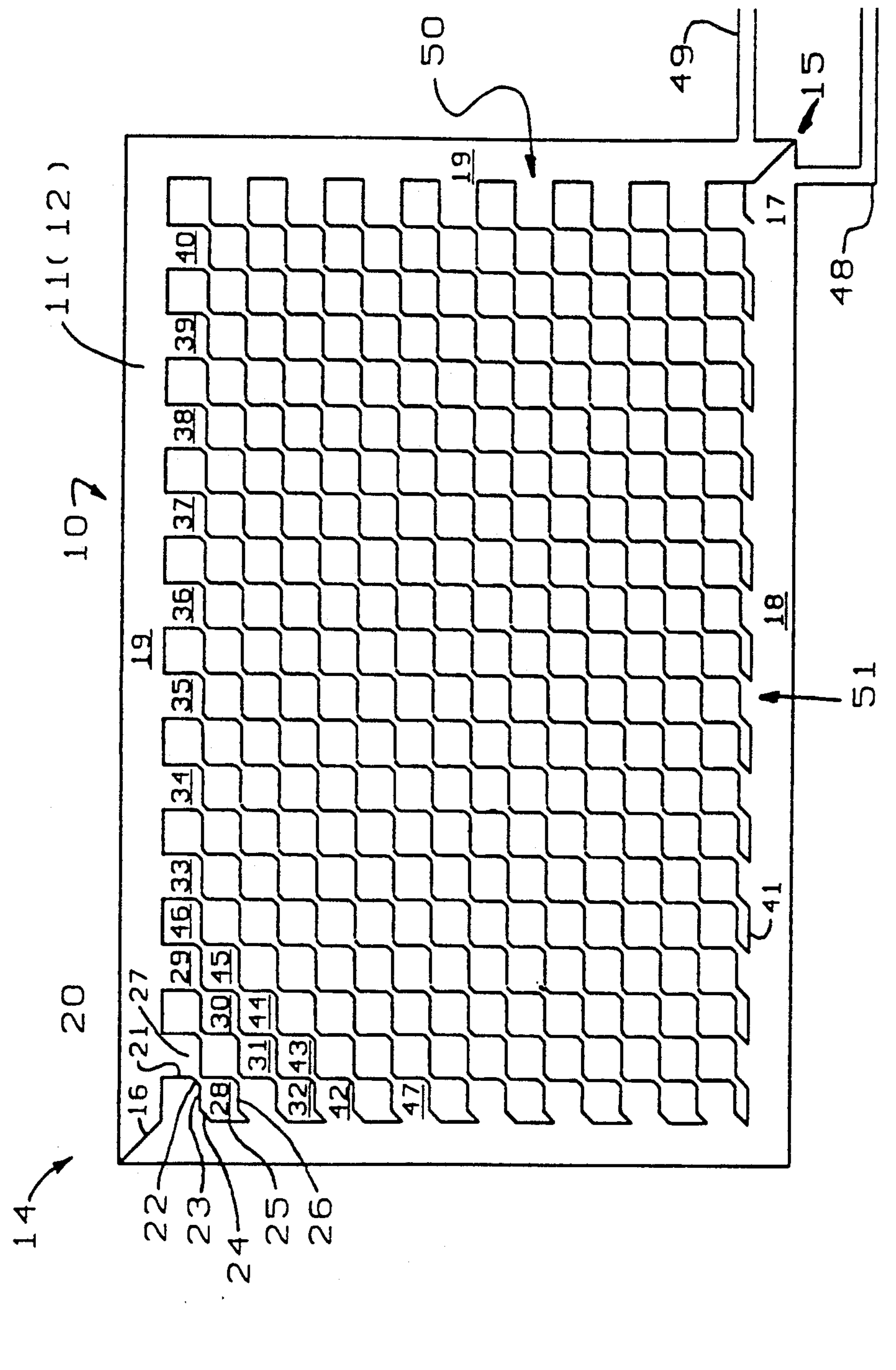
FIG. 1 is a diagrammatic top plan view showing the structure of a preferred embodiment of a mat or mattress.
Figure 10:
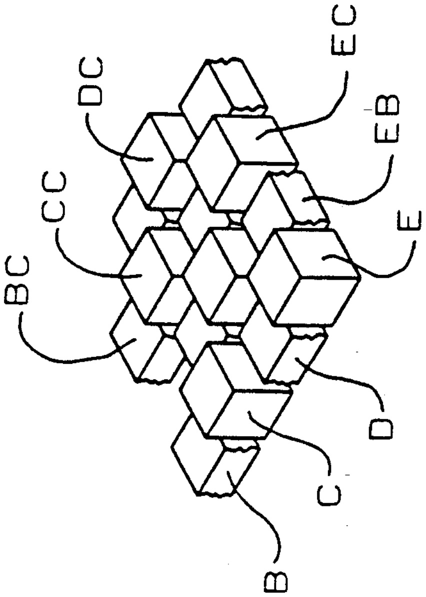
FIG. 10 is a simplified perspective view of the overall arrangement of the cells of the embodiment of FIGS. 6 to 9.
Figure 2:
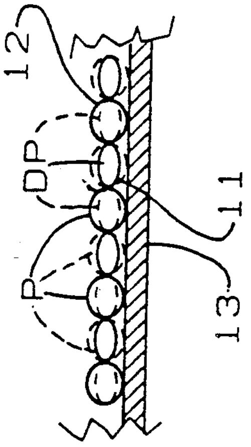
FIG. 2 is a diagrammatic, partial section II—II taken transversely of the mat and showing how the cells of one row are arranged with respect to each other in operation, with one group of cells being shown pressurized and the other depressurized.

Turning firstly to the representations of FIGS. 1 and 2, a pressurizable mat 10 comprises a base sheet 11 and a cover sheet 12. The sheets 11 and 12 are made from a suitable flexible but generally non-elastic material such as PVC, rubberized textile or Gore-Tex (a trade mark). It is preferred that the flexible material be a generally non-stretchable sheet material such as rubberized fabric. In order to facilitate the understanding of the orientation of the base sheet 11 and the cover sheet 12, the sectional view of FIG. 2 shows a support surface 13 which presents the uppermost surface of a regular bed, of a seat or the like. The base sheet 11 rests on the support 13. The cover sheet 12 forms that face of the mat 10 which is turned away from the support 13.

The mattress 10 includes a plurality of alternately pressurizable and depressurizable cells. This is achieved by welding the base sheet to the cover sheet along a continuous weld line which, in the embodiment shown, extend from one corner 14 to the diagonally opposed corner 15.

Reference numeral 16 designates the end of the continuous weld line at corner 14. Reference numeral 17 designates the other end of the weld line at corner 15.

Apart from forming the pressurized and depressurized cells, the weld line 16 - 17 also divides the interior of the mat 10 into two separate chambers la, 19. The first end 16 of the weld line is welded to the corner 14 and extends first diagonally and then merges sequentially with two straight sections 20, 21 disposed are at right angles to each other. The second section 21 merges, over a bevelled corner 22 with a third section 23 which is parallel with the first section 20 and whose end opposed to the first corner 22, forms a second bevelled corner 24 which presents a transition between the third section 23 and a fourth section 25 merges with a fifth section 26. The weld line then continues from the fifth section 26 in a zig-zag fashion to the chamber 19 and then turns back, over a square-shaped initial portion to extend to the first chamber 18 and there again to turn back to the second chamber 19 and in the same fashion throughout the entire area of the mat 10 to the proximity of the second corner 15 at which the second end 17 of the weld line is impermeably welded to the corner 15 to separate the chambers 18, 19 from each other.

The zig-zag shape of the weld line is structured to form a number of square-shaped cells of which the sideways adjacent cells belong to the different one of the cell groups. The cells adjacent to each other in the diagonal direction from the bottom left to the upper right of FIG. 1 communicate with each other at the bevelled corners In the other diagonal direction, i.e. the general direction from corner 14 to corner 15, the adjacent cells do not communicate with each other.

Reference numeral 27 designates a cell which is open into the second chamber 19 and is isolated from the space of the first chamber 18. The communication from the second chamber 19 through the cell 27 is to another cell 28 which, like the cell 27, is isolated from the first chamber 18. The next diagonal cell opening into and communicating with the second chamber 19 is cell 29. It communicates, through two intermediate cells 30, 31, with cell 32 at the end of the particular diagonal line of cells 29, 30, 31 and 32, at the chamber 18 but isolated therefrom.

There is a number of further cells, e.g. cells 33, 34, 35, 36, 37, 38, 39, 40, each of which is open into the second chamber 19 and forms a first cell of a diagonal row of cells.

Reference should now be had, as an example, to the cell 42 at the left of FIG. 1. This cell 42 is open into and communicates with the second chamber 18. At the respective bevelled corners, the cell 42 further communicates with a cell 43, 44, 45, 46. The terminal cell 46 of this diagonal line is disposed at the chamber 19 but is not in communication therewith. The next cell at the first chamber 18 adjacent to the aforesaid cell 42 is cell 47 which again communicates with its associated row of cells in the same diagonal direction.

In general terms, the group of cells communicating with the first chamber 18 (i.e. said cells disposed in lines such as the line of cells 42, 43, 44, 45 and 46) are referred to as a first group of cells, while the cells communicating with the space of the second chamber 19, for instances cells 29, 30, 31 and 32 and the cells associated with the cells 33-40 and with the remaining cells of that system, are referred to as a second group of cells. Each of the first and second chambers 18 and 19 and thus the first and second group of cells communicates with a discrete port for delivery and discharge of pressurized fluid. In the embodiment described, the fluid is water. The port 48 communicates with the first chamber 18 and thus with the first group of cells while the port 49 communicates with the second chamber 19 and with the associated second group of cells.

It will be appreciated on realizing the arrangement just described that the cells are also oriented in two systems of rows, longitudinally and transversely of the rectangle of the mat 10. One of the rows of the longitudinal system of rows of the cells is designated with reference numeral 50. One of the rows of the transverse system of rows of the cells is designated with reference numeral 51.

The cross sectional view of FIG. 2, while specifically designated with the sectional line II—II, presents the structure as viewed in a cross section along any of the rows of cells parallel with the rows 50 or 51. Each of the longitudinal or transverse rows is straight. Each row is generally parallel with the surface of the mat. The rows intersect each other at an angle of 90°. The angle of 90° is optional but is preferred as it provides a checkerboardlike arrangement which was found to be particularly suitable both from the standpoint of maintaining uniform pressure throughout the mat and from the standpoint of production. However, it can be easily seen that it does not take a major structural modification to arrange the cells of the mat such that the angle of intersection of the rows 50 and 51 would be other than 90°.

The alternating nature of the arrangement of the cells is indicated in FIG. 2 which shows the first group of cells in a pressurized condition (P in FIG. 2), while the flattened contour DP of the cells in FIG. 2 indicates that the group to which the particular cell belongs is depressurized at the given point in time.

When the ports 48, 49 are connected to suitable sources of alternate pressurization and depressurization, the checkerboard-like pattern of the surface of the mat is raised or lowered assuming, of course, that both the pressurization and the pressure release are of a sufficient magnitude with respect to the weight of the body supported by the mat.

Figure 3:
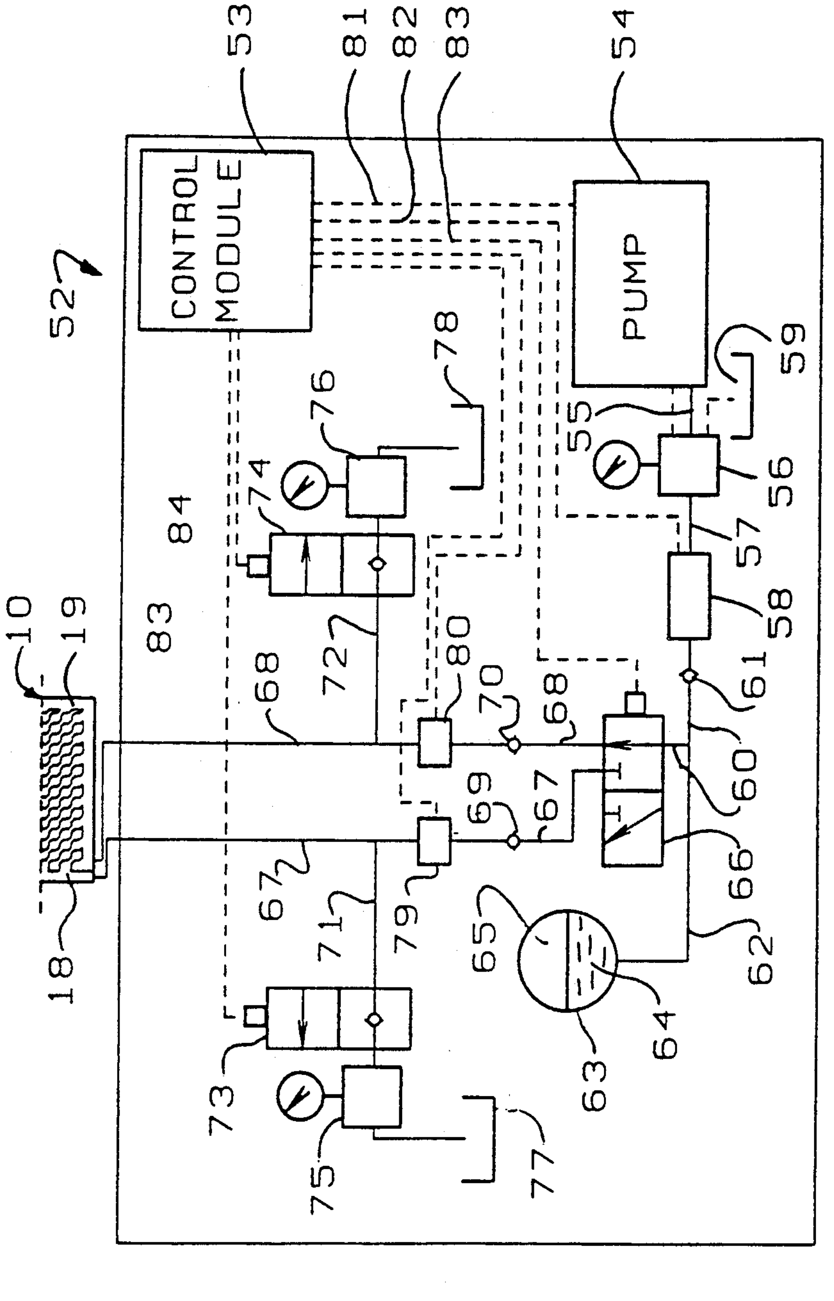
FIG. 3 is a simplified diagrammatic representation of one embodiment of a pressurized liquid supply system according to the present invention.

Reference may now be had to FIG. 3 which shows a pressurized liquid supply system 52 for use with a mat such as mat 10. The system is provided with a programmable control module 53 adapted to actuate and deactivate various elements of the system 52 during its operating cycle. Reference numeral 54 designates a pump whose pressure side communicates via a line 55 with the inlet of a high pressure regulator 56. The purpose of the pressure regulator 56 is to maintain a uniform pressure at its outlet which is connected to a line 57 provided, in the embodiment shown, with a flow-through heater 58 adapted to maintain the water in the system 52 at a uniform temperature. Reference numeral 59 designates a sump of the pressure regulator 56. As is well known, the sump 59 is operatively associated with the suction side of pump 54 for circulation of the liquid. The outlet side of heater 58 communicates with line 60 having a non-return valve 61. A branch line 62 of the line 60 is provided with a pressure accumulator 63 containing a volume of water 64 and a pressurized air cushion 65. As is well known, the accumulator 63 serves as a source of pressurized liquid and simultaneously acts as a device for absorbing sudden pressure shocks when they occur within the system. A distributor valve 66 is adapted to connect the line 60 alternately to a first line 67 or to a second line 68.

Each of the lines 67, 68 is provided with a non-return valve 12, 70, respectively. Each of the lines 67 and 68 further comprises a branch 71, 72. Each branch 71 and 72 has a check valve 73, 74 and a pressure regulator 75, 76 whose sump 77, 78 may be connected through a line not shown in the drawings, to the suction side of the pump 54. The embodiment of FIG. 3 further comprises a pair of vibrators 79, 80, one in each of the lines 67 and 68. The discharge end of each of the lines 67 and 68 at the mat 10 presents the respective ports 48, 49 as mentioned above.

In operation, the system 52 including the mat 18 and 19 is filled with water and strategically located air bleed valves (not shown in FIG. 3) are used to remove air pockets from the system. The only air pocket remaining is the pressurized air cushion 65 mentioned above. The control module 53 actuates, through control line 81, the pump 54. Pressurized water flows through the pressure regulator 56 to heater 58. The heater 58 is controlled by control line 82 Pressurized water overcomes the closing pressure of non-return valve 61 and flows through the distributor valves 66 into line 68, past non-return valve 70 and vibrator 80 into the second chamber 19 of the mat 10. The particular disposition of the distributor valve 66 is activated by control line 83. The actuation is so arranged that when the control signal of line 83 brings the distributor valve 66 to a position shown in FIG. 3, the control line 83 associated with the check valve 73 brings the valve to an open state while the control line 84 maintains the second check valve 74 closed. Thus, the line 67 (and the first chamber 18 of the mat 10) is now relieved of pressure down to a value which is predetermined by the setup of the pressure regulator 75. On reversal of the position of the distributor valve 66 to pressurize line 67, the check valve 74 opens to depressurize line 68 while the check valve 73 shuts off the associated branch 71. The additional elements such as heater 58 and vibrators 79, 80 may be activated as the need of the particular operation dictates.

It will thus be appreciated that, referring to the general definition of the present invention at the outset, the pump 54 presents one embodiment of liquid priming means and that the conduits 55, 57, 60, 67 and 68 present conduit means for alternately delivering the primed liquid to the first group of cells or to the second group of cells. On the other hand, the check valves 73, 74 present an embodiment of pressure release means for alternately reducing liquid pressure in the associated group of cells as the other group of cells is being primed and vice versa.

The accumulator 63 is adapted to resiliently absorb sudden increases in liquid pressure which might occur within the mat, for instance, if a patient rests on his elbow, creating a high specific pressure over a relatively small area of the mat and through the fill of pressurized water, in the entire system.

Figure 4:
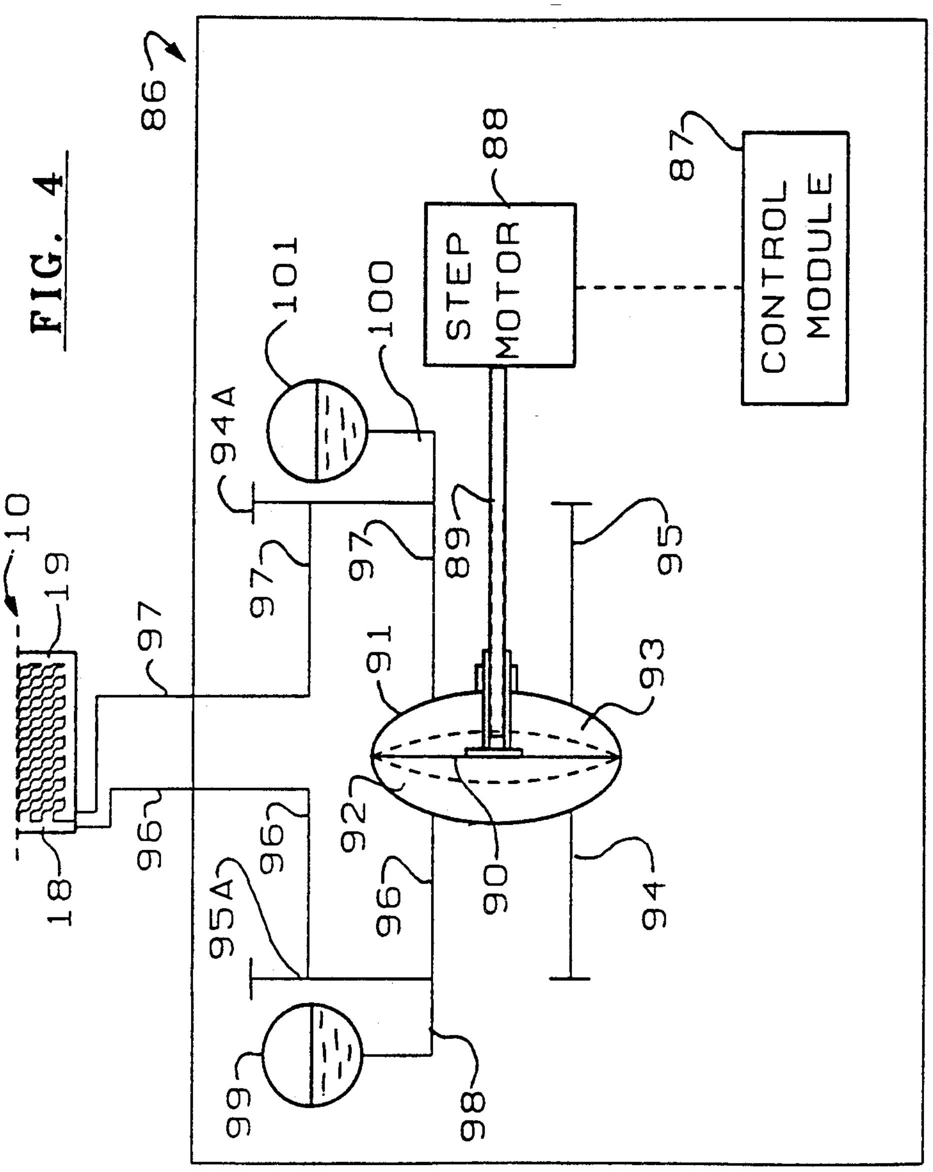
FIG. 4 is a simplified diagrammatic representation of another embodiment of the pressurized liquid supply system according to the present invention.

The embodiment of FIG. 4, presents a substantial simplification. The system 86 is similar to that of FIG. 3 in that it also has a liquid priming means but the liquid priming means is of a different kind from the pump 54 in FIG. 3. In FIG. 4, the control module 87 actuates a step motor 88. The step motor 88 is adapted to cause axial displacement of a control rod 89 alternately in a direction to the left and to the right of FIG. 4. The free end of the control rod 89 is connected to a flexible diaphragm 90 disposed centrally of a housing 91. The diaphragm 90 forms an impermeable partition of the housing 91 subdividing same into two chambers 92, 93.

Reference numerals 94, 95 present fill lines adapted to completely fill the chambers 93, 92 with water or other suitable hydraulic medium. Appropriate air bleed arrangement is also provided as is well know in the art of hydraulics. It is indicated in a simplified fashion at points 94A, 95A each being a part of a respective conduit 96, 97 communicating with the respective chambers 18, 19 of the mat 10. A branch 98 is provided in line 96 to communicate same with a pressure accumulator 99. The opposite line 97 has a similar branch 100 communicating with an accumulator 101. The two accumulators 99, 101 operate in the same fashion as the accumulator 63 mentioned above.

In operation, the control module 87 causes the step motor 88 to displace the control rod 89 to the left of the figure. This results in the displacement of the diaphragm 90 and in the resulting pressurization of the liquid in chamber 92 and, through line 96, in chamber 18 of the mat. At the same time, the deformation of the diaphragm 90 results in a slight increase of the volume of chamber 93 with the corresponding depressurization communicated through line 9 to the chamber 19.

After a predetermined period of time, the control rod 89 is displaced by the step motor 88 to the right, reversing the deforming of the diaphragm 90 to pressurize chamber 93 and depressurize chamber 92 (and with them the chambers 19, 19.

The embodiment of FIG. 4 does not require any valves. The system, of course, can also be provided with vibrators water heaters or other auxiliaries as the need may arise.

Figure 5:
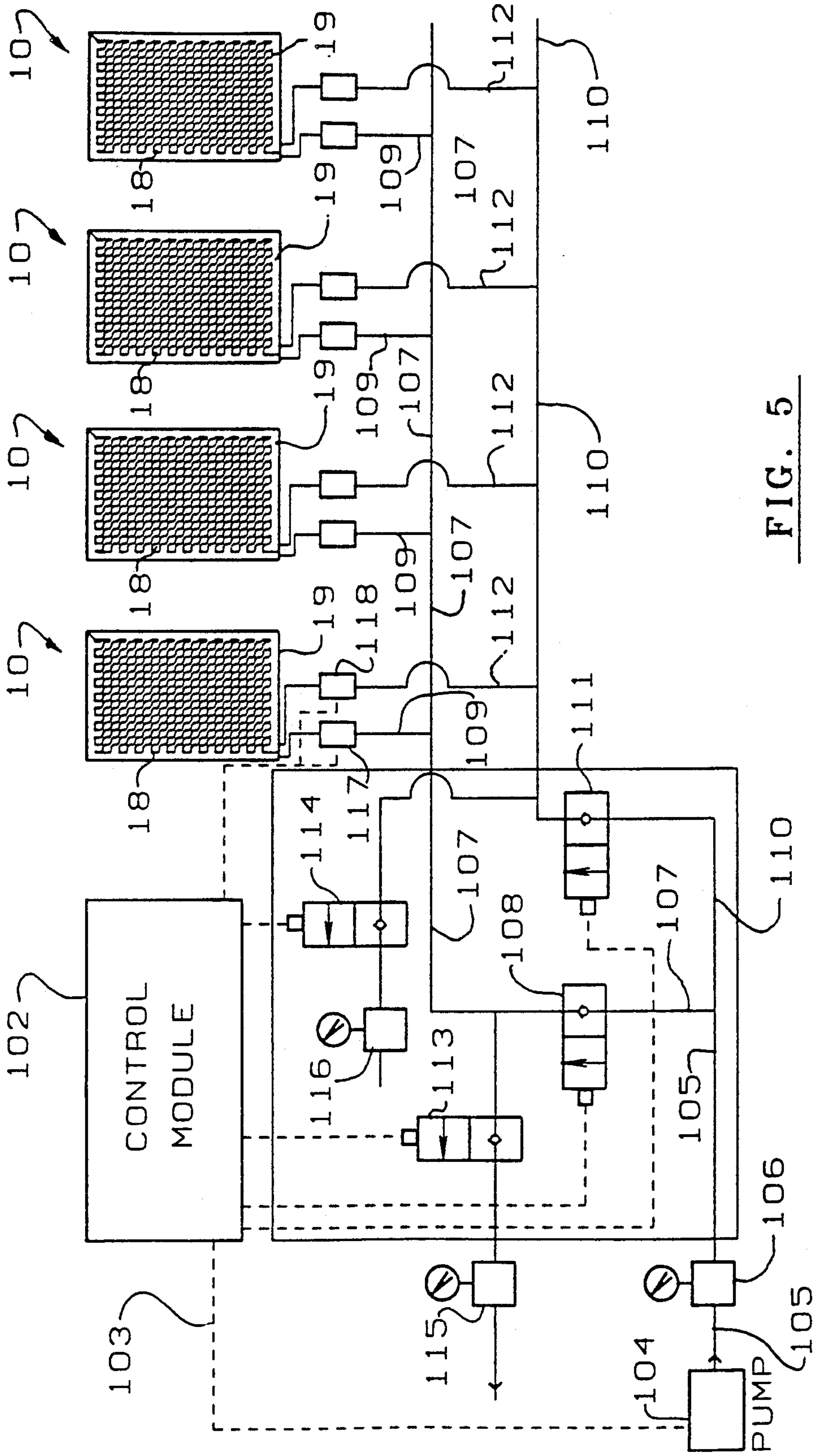
FIG. 5 is a simplified diagrammatic representation of yet another embodiment of the pressurized liquid supply system of the present invention.

FIG. 5 shows that the present invention can also to be used in an arrangement where multiple mats are operated by a single system. As in the preceding embodiments, the system has a control module 102 operatively associated, through a control line 103, with a pump 104 in a fashion similar to the arrangement and operation of the embodiment of FIG. 3. The pump 104 communicates, via line 105, with a high pressure regulator 106 and with a first branch 107 provided with a check valve 108 and having associated branches 109 connected to the respective first chamber 18 of each of the associated mats 10. The second branch 110 of the line 105 connects through a check valve ill and associated branches 112 with the respective second chambers 19 of each of the mats 10. Each of the branches 107, 110 is provided with a respective pressure release check valve 113, 114.

As in the embodiment of FIG. 3, each pressure release valve 113, 114, is associated with a low pressure regulator 115, 116 to maintain a predetermined minimum pressure in the depressurized chamber 18 or 19.

The operation of the arrangement of FIG. 5 is similar to that of FIG. 3. The pump 104 primes the liquid (water) through line 105, branch 107 and branches 109 to the cells communicating with chambers 18 of each of the mats 10. The check valve 111 is now closed and the check valve 114 open whereby pressure within the line ill and thus within branches 112 and chambers 19 is low and is maintained by the value preset at the low pressure regulator 116. Upon a predetermined period of time, the operation is reversed. The liquid is now primed by the pump 104 through branch 110, the now open check valve 111 and associated branches 112 to the chambers 19 of mats 10, while the check valve 114 is now closed. With the check valve 113 now open (and the check valve 108 closed), the previously primed system of chambers is now in a depressurized state which is predetermined by the value set at the low pressure regulator 115.

A set of heaters such as heaters 117, 118 is arranged upstream of the inlet of the respective branches 109, 112 to the associated chambers 18, 19, i.e. upstream of the ports 48, 49. It is preferred that the heaters 117, 118 be disposed close to the respective mats so that individual control of temperature in the respective mats can be achieved.

Reference should now be had to FIGS. 6–10. The embodiment of the mattress shown therein is to be appreciated as a mere diagrammatic representation of the principle of structure. In particular, the number of cells shown therein is substantially smaller than it is visualized to be in the actual commercial product. The reduced number of cells was selected to facilitate the indication of the structure in the drawings and thus to facilitate the understanding of the second embodiment of the inventive mattress.

The pressurizable mat 210 comprises a base sheet 211 (FIGS. 7–9) and a cover sheet 212. An intermediate sheet 213 is interposed between the two. As in the case of the first embodiment, the sheets 210–213 are made from a suitable flexible but generally non-elastic material such as PVC, rubberized textile or Gore-Tex (a trade mark). It is preferred that the flexible material be a generally non-stretchable material for reasons explained above.

One of the differences from the first embodiment described is that the cover sheet 212 is glued or welded to the intermediate sheet and is preformed such that it provides a plurality of square cavities. Each cavity forms, upon welding of the cover sheet 212 to the intermediate sheet 213, a cell. The cells are marked with letters. The first row (vertical in FIG. 6) comprises cells A, B, C, D, and Z. The second row, parallel with the first row, has cells designated with letters AB, BB, CB, DB and EB. The subsequent rows are designated accordingly: AC to EC; AD to ED; AX to EE etc.

Figure 6:
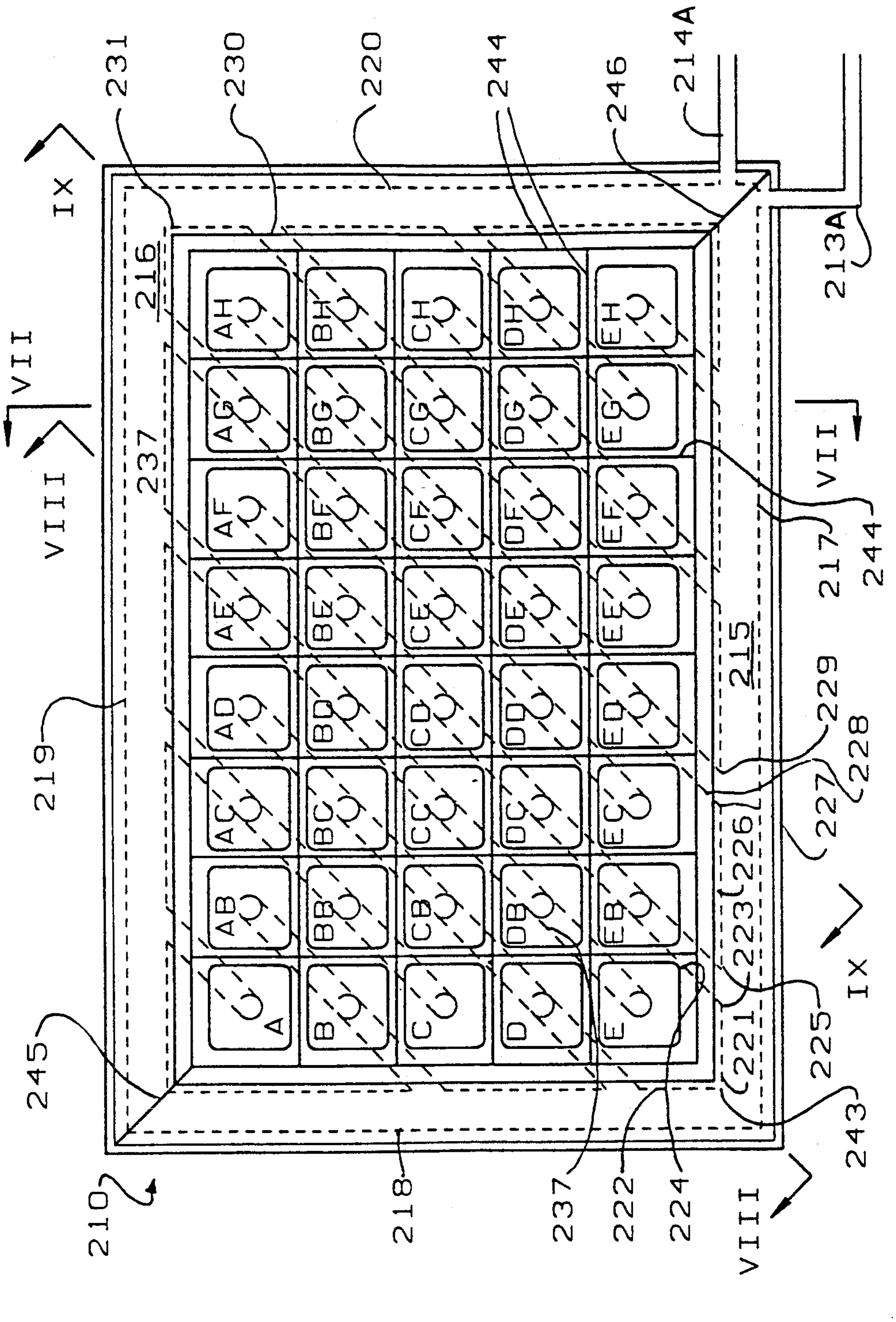
FIG. 6 is a top plan view similar to that of FIG. 1 but showing another embodiment of the mat according the present invention.

It should be noted that the diagram of FIG. 6 shows two kinds of weld lines: the weld lines connecting the intermediate sheet 213 to the base sheet 211 are marked as dash lines while the welds connecting the cover sheet 212 to the intermediate sheet 213 are shown as dotted lines.

Fluid inlet ports 213A, 214A communicate each with the respective chamber 215, 216. The chambers 215, 216 are limited by peripheral welds 217, 218, M, 220. At the inside of the mat 210, the chambers 215, 216 are delimited by a series of welds extending along the respective chamber but also diagonally of the rectangle of the mat. The courses of these weld lines can be appreciated on review of FIG. 6. For example, at the corner of welds 217 and 218, the inside weld lines 221. 222 extend each along the respective side of the corner. There is an obtuse-angled corner M which deflects the weld line 221 to a diagonal section 224 which extends all the way to the cell AF, and back to the chamber 215 to merge, over an acute angle 225, with the next longitudinal section 226 parallel with the elongation of the chamber 215. The longitudinal section 226, in turn, merges, over an obtuse angled corner 227, with another diagonal section 228 extending across all the way up to the cell AH and having an opposed angled corner 229 at its entrance.

Figures 7, 8, 9:
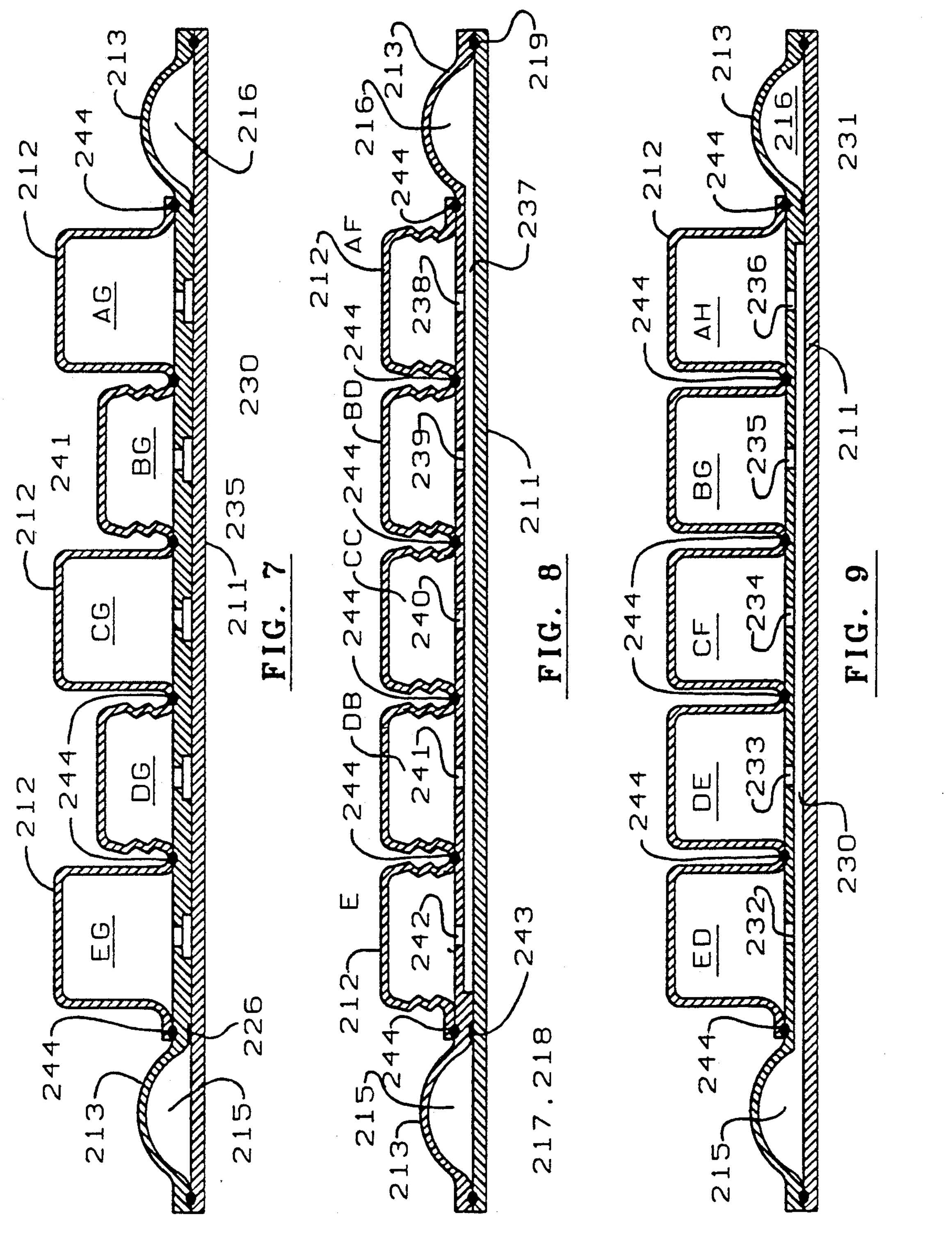
FIG. 7 is section VII—VII of FIG. 6.
FIG. 8 is section VIII—VIII of FIG. 6.
FIG. 9 is section IX—IX of FIG. 6.

The two straight, parallel parts of the diagonal section 228 form sides of a diagonal channel 230 which is also shown in the sectional view of FIG. 9. The channel 230 communicates with the chamber 215 but does not communicate with the chamber 216 as the corner section of a weld 231 at the upper right corner of FIG. 6 separates the two from each other.

The channel 230 communicates through apertures 232–236 with the interior of cells ED, DE, CF, BG and AH, respectively, as shown in FIG. 9. On realizing the disposition of channel 230 and its associated cells as set forth above, one can see that every second diagonal row of the cells communicates in similar fashion with the chamber 215 but is isolated from chamber 216. The cells communicating with chamber 215, form one or first group of cells.

The structural arrangement of the other or second group of cells associated with chamber 216 is identical and relates to the remaining alternate diagonal rows of cells of which the diagonal row E, DB, CC, BD, AE is shown in FIG. 8. as being associated with a channel 237 communicating with the cells of the row through apertures 238–242. The lower left corner weld 243 separates the channel 237 from the chamber 215.

The cover sheet is welded to the top surface of the intermediate sheet 213 by a weld 244 extending longitudinally and transversely of the mat. The peripheral section of the weld 224 extends along the inner periphery of the chambers 215, 216. As in the first embodiment, the chambers 215, 216 are separated from each other at diagonally opposite corners by partition welds 245, 246.

The operation of the embodiment described is the same as that of the first described embodiment. The pressurization and depressurization of the respective group of cells takes place by alternatively communicating one of the ports 214, 215 (in the embodiment shown port 214) with a source of pressurized fluid, while the group of cells of the other port 215 is relieved of pressure.

Due to the premolded shrunk configuration of the cells of the cover sheet 212 as shown (see cells DG and BG in FIG. 7 as an example), the cells can alternatively raise or retract, providing the alternating support as described.

Those skilled in the art will be appreciate that many other embodiments of the present invention, both with respect to the mat and with respect to the pressurizing system itself can be made which would differ from the embodiments described but would still fall within the scope of the present invention. Accordingly, we wish to protect by letters patent which may issue on the present application all such embodiments as properly fall within the scope of our contribution to the art.

I claim:

1. A mat (10) pressurizable by a fluid, made of a flexible top sheet (11) and flexible bottom sheet (12), the top and bottom sheets (11, 12) being sealed together to define a plurality of alternately pressurizable and depressurizable cells, said cells being arranged in two groups of cells forming a first group (46—46) of cells (B-AB; D-AD; E-AF through EH) and a second group (29–40) of cells A; C-AC, E-AF, EC-AG and EG-DH) each group of cells communicating with a discrete port (213A; 214) for delivery and/or discharge of pressurized fluid, characterized in that, with the mat (10) spread out on a generally planar surface, the cells (A through EH) are disposed within the same plane and are arranged in a pattern which consists of a first system (215) of cells and a second system (216) of cells, said cells being all disposed in a plane generally parallel with the bottom sheet (12) of the mat, said cells also being arranged in a plurality of first cell rows (A-AH through E-EH) parallel with each other, and in a plurality of second cell rows (A-E through AH-EH) parallel with each other, said first and second cell rows intersecting each other at an angle of intersection of less than 180° the cells (A, AB, AC . . . AH through E, EB, EC . . . EH) of each of said rows being alternately the cells of the first system (215) the cells of the second system (216) of cells.

2. The mat of claim 1, wherein said angle of intersection is about 90°.

3. The mat of claim 2, wherein the mat is rectangular and the rows are oriented longitudinally and transversely of the mat.

4. The mat of one of claim 1, wherein the cells are generally square in plan, the size of each cell being about 1.5×1.5 inches in plan.

5. A pressurized fluid supply system for use in alternately increasing and decreasing liquid pressure in a first group of cells of a hollow, flexible but generally non-stretchable pressurized liquid mat and a second group of cells of the mat, respectively, characterized in that the fluid supply system is a liquid supply system which comprises:

(a) liquid priming means, (54, 91, 104) connected by conduit means (67, 68; 96, 97; 109, 112) to a respective mat (10) to alternately deliver primed liquid to said first or second group of cells to increase liquid pressure therein;

(b) liquid pressure release means (73, 74; 91; 113, 114) operatively associated with said conduit means for alternately reducing liquid pressure in said second or first group of cells as the other group of cells is being primed;

(c) resilient liquid pressure accumulator means (65; 99, 101) associated with the conduit means and adapted to maintain the pressure in the respective mat at a generally uniform level and to resiliently absorb sudden increases in liquid pressure occurring with the system and thus within the respective mat.

6. The system of claim 5, wherein the liquid priming means and the liquid pressure release means is formed by a diaphragm primer having a housing (91) provided with a diaphragm (90) into a first chamber (92) and a second chamber (93), said diaphragm (90) being connected with the drive means (88, 89) arranged to alternately urge the diaphragm subdividing the housing into one of the chambers and away from the other chamber and vice versa, said conduit means including first conduit means (96) communicating said first chamber (92) with the first group of cells of the respective mat (10), and second conduit means for communicating said second chamber with the second group of cells of the respective mat.

7. The system of claim 6, wherein a separate pressure accumulator means (99, 101) is provided in each of said first and second conduit means (96, 97).

8. The system of claim 5, wherein the liquid priming means is a liquid pump (54) whose pressure side (55) communicates with a pressure conduit (57, 60) which, in turn, communicates via a distributor valve (66) alternately with first conduit means (67) for communicating a first exit port of the valve (66) with the first group of cells of the respective mat, and with second conduit means (68) for communicating a second exit port of the distributor valve (66) with the second group of cells of the respective mat, said pressure accumulator means (65) being connected to said pressure conduit (62–60), whereby the pressure accumulator means (63) communicates only with that conduit means which is being used in increasing the liquid pressure in the respective group of cells.

9. The system of claim 8, wherein each of the first and second conduit means (67, 68) is operatively associated with a check valve means (73, 74) for reducing pressure in the respective conduit means (67, 68) and thus in the respective group of cells, each check valve means being arranged in series with a respective selectively adjustable low pressure regulator (75, 76) controlling the minimum pressure maintained in the respective conduit means (67, 68) and thus in the respective depressurized group of cells.

10. The system of claim 9 further comprising vibrator means (79, 80) disposed downstream of said distributor valve (66) and adapted to generate vibratory pressure shocks in the conduit means (67, 68) and thus in the associated group of calls.

11. The system of claim 10 wherein one vibrator means (79, 80) is provided for each of the first and second conduit means (67, 68).

12. The system of one of claim 5, wherein said conduit means (107, 110) comprises a plurality of pairs of connection ports (109, 112) for connecting said system to a plurality of mats (10).

* * * * *